United States Patent [19]
Beery

[11] 4,087,789
[45] May 2, 1978

[54] MAGNETIC INK CHARACTER RECOGNITION SYSTEM

[75] Inventor: Jack Beery, Farmington, Mich.

[73] Assignee: Burroughs Corporation, Detroit, Mich.

[21] Appl. No.: 791,241

[22] Filed: Apr. 27, 1977

[51] Int. Cl.² .................................................. G06K 9/00
[52] U.S. Cl. ............................ 340/146.3 C; 235/449; 340/146.3 H; 360/70
[58] Field of Search ............... 340/146.3 C, 146.3 H, 340/146.3 AH, 146.3 F; 235/61.12 M, 61.11 E, 61.11 D; 360/70

[56] References Cited

U.S. PATENT DOCUMENTS

| | | | |
|---|---|---|---|
| 3,105,956 | 10/1963 | Greanias et al. | 340/146.3 H |
| 3,221,302 | 11/1965 | Silverberg | 340/146.3 H |
| 3,272,969 | 9/1966 | Cutaia | 235/61.11 D |
| 3,463,877 | 8/1969 | Crum | 360/70 |
| 3,577,203 | 5/1971 | Beach | 340/146.3 C |
| 3,801,804 | 4/1974 | Von Glahn et al. | 235 61.11 D/ |
| 3,818,446 | 6/1974 | Benson | 340/146.3 C |
| 3,825,728 | 7/1974 | Nakauchi et al. | 235/61.11 D |
| 3,883,737 | 5/1975 | Throssell et al. | 340/146.3 F |
| 3,978,450 | 8/1976 | Sanner et al. | 340/146.3 C |
| 4,040,097 | 8/1977 | Mizuno | 235/61.11 D |

Primary Examiner—Leo H. Boudreau
Attorney, Agent, or Firm—Carl Fissell, Jr.; Robert C. J. Tuttle; Kevin R. Peterson

[57] ABSTRACT

In a magnetic ink character recognition (MICR) system, a document bearing magnetizable ink characters is transported past a write station for magnetization preparatory to reading the characters. Each of the ink characters is divided into a plurality of discrete vertical segments; each segment being individually magnetized by a write head in the write station. The velocity at which the document is transported is sensed and time-correlated to the magnetization of each discrete segment to avoid irregularly spaced magnetization due to non-uniformities in transport velocity.

13 Claims, 5 Drawing Figures

MAGNETIC INK CHARACTER RECOGNITION SYSTEM

BACKGROUND OF THE INVENTION

1. Field of the Invention

The present invention relates to magnetic ink character recognition (MICR) systems, and more particularly to a MICR system wherein each character field is divided into a plurality of discrete lines or segments that are individually magnetizable preparatory to character recognition.

2. Description of the Prior Art

Magnetic ink character recognition involves two fundamental steps in the recognition process. First, the magnetizable ink forming a recognizable character must be magnetized to create a magnetic image of the character; and secondly, the magnetic image must be sensed or read and identified as a character in accordance with pattern recognition techniques.

Focusing on the first step of the recognition process, the character field is generally divided into a plurality of discrete, vertical lines or segments, each line or segment being individually magnetized. A common magnetization technique is to apply a sinusoidally-varying magnetic field over the character, where each sinusoidal cycle is intended to magnetize one discrete segment of the character. This technique has been shown by experience to facilitate the reading and recognition of the character.

In practice, when a document bearing encoded characters of magnetizable ink is magnetized or written upon, it is transported past a write station having a write head that generates the sinusoidally varying magnetic field. The transportation of the document past the write station is generally by mechanical means, such as by a read drum having an outer circumferential edge that grips the document and rotationally transports it past both the write and read stations. It is important that the mechanical transport means be driven at a uniform, consistent velocity to correlate the position of the character field in the write station with the timed actuation of the write head for properly spaced magnetization to occur.

This requirement of consistent, uniform transport velocity necessitates the use of highly precise, low-tolerance mechanical equipment. If there is a slow down or speed up in the document transport velocity, no matter how slight, it will be reflected as an irregularity in the magnetization of a discrete segment in the character field.

It is therefore an objective of the present invention to correlate the position of each discrete segment of a character field in the write station with the timed magnetization of that segment, independent of non-uniformities or inconsistencies in document transport velocity.

BRIEF SUMMARY OF THE INVENTION

The present invention generally addresses the problem of irregularities in phase or intensity character magnetization by sensing the document transport velocity and using the sensed information to regulate the timing of the magnetization of the encoded characters on the document.

Broadly, the sensing means detects the travel of the document through one or more discrete segments of the character field and produces a signal representative of such travel. This signal is then used to enable the write head to magnetize the encoded character in proper time synchronization.

In the preferred embodiment, the document is transported by means of a rotational read drum. The angular velocity of the read drum is sensed by a tachometer, which in the disclosed embodiment, is an optical tachometer. By taking into account the dimensions of the read drum and the number of output signals through one full revolution of the tachometer, a signal can be generated for each discrete segment of a character field. Accordingly, each discrete segment of a character is properly magnetized independent of irregularities in document transport velocity caused by the mechanical transport apparatus.

Other advantages of the present invention will be readily appreciated as the same becomes better understood by reference to the following detailed description when considered in connection with the accompanying drawings.

DETAILED DESCRIPTION OF A SPECIFIC EMBODIMENT

Figure 1:
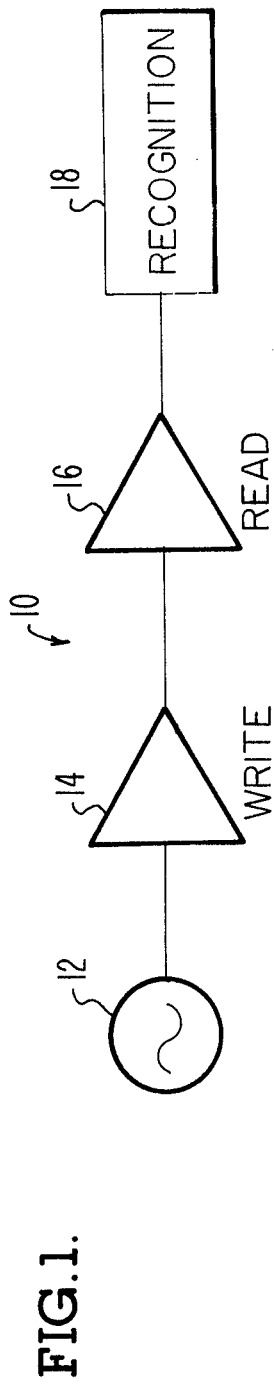
FIG. 1 is a generalized block diagram of a magnetic ink character recognition system.

With reference to FIG. 1, a magnetic ink character recognition (MICR) system of the type for which the present invention is adapted, is broadly represented in block diagram form at 10. The MICR system 10 comprises an AC electrical source 12 which energizes a write head 14. More specifically, when a document bearing encoded characters formed of magnetizable ink passes through a write station containing the write head 14, the characters are magnetically energized by a sinusoidally-varying magnetic field. Once energized, the characters may be read as they pass through a read station containing a read head 16 that is sensitive to magnetic flux density. The output of the read head 16 is input to a recognition circuit 18 which recognizes and further processes the encoded characters.

Figure 2:
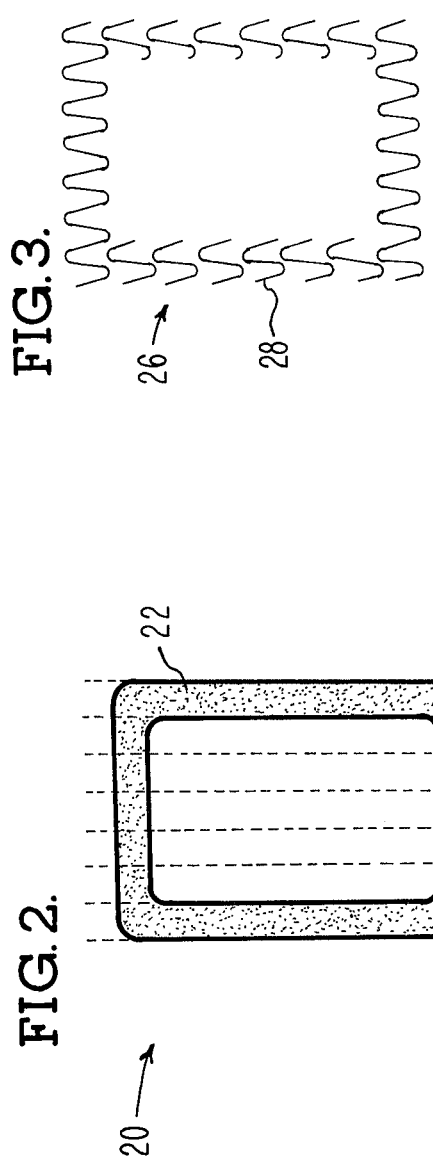
FIG. 2 is an illustration of a character field, divided into a plurality of discrete, vertical lines or segments.

A general field format for the MICR numeral zero (0) is shown at 20 in FIG. 2. The character field 20 comprises a plurality of discrete segments, identified as 1, 2, 3, 4, 5, 6 and 7. The number of discrete segments may vary from one alphanumeric character to the next in accordance with the MICR encoding convention used; the selection of the numeral zero (0) being only for purposes of illustration. Each of the discrete segments of the numeral is an equal vertical division of the field 20 and represents an independent magnetizable element. In the specified example of FIG. 2, for the numeral zero (0), the leftmost and rightmost segments 1 and 7, respectively, are fully magnetized over their vertical dimension, and segments 2, 3, 4, 5 and 6 are magnetized only at the upper and lower extremes of their vertical dimensions.

Figure 3:
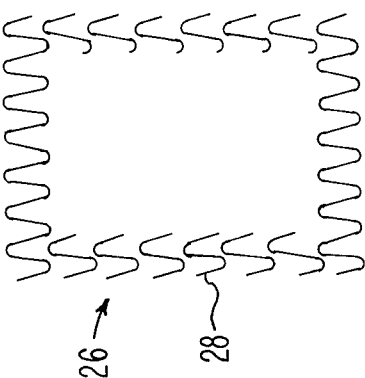
FIG. 3 is a magnetic image of the character of FIG. 2 when energized in accordance with the magnetizing signal of FIG. 2.

The ink on each segment is magnetized by the application of a sinusoidally-varying magnetic field as represented by 24. Each discrete field segment corresponds to one full sinusoidal cycle of the magnetic field 24. The magnetic image of the numeral zero 22 is represented as 26 in FIG. 3. It may be seen that segment 1, for example, has one full sinusoidal cycle of magnetization as indicated by 28. FIG. 3 generally represents an idealized magnetic image for the numeral zero that is properly conditioned for reading and recognition.

Figure 4:
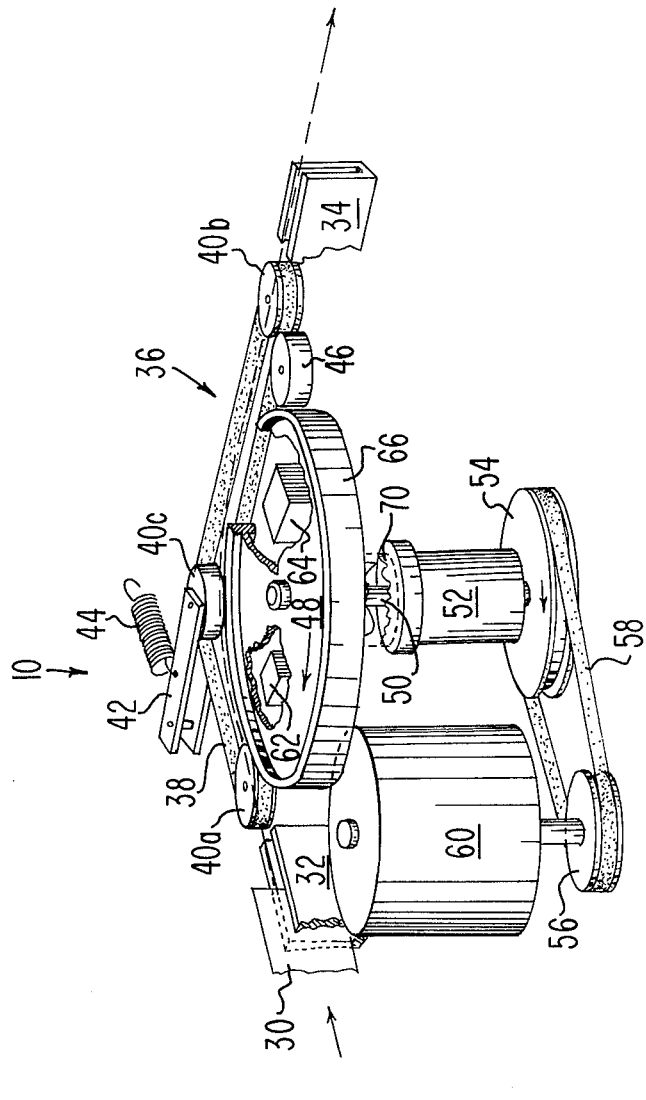
FIG. 4 is a diagrammatic view of a practical embodiment of a magnetic ink character recognition system.

A practical embodiment of the MICR system 10 of FIG. 1 is illustrated in FIG. 4. A record medium, such as a document 30, bears encoded characters formed of magnetizable ink. The document 30 passes through the MICR system in a transport track having a linear entry segment 32, a linear exit segment 34, and a curvilinear central segment 36. The curvilinear central segment 36 is more specifically defined to include a belt 38 mounted on three triangularly-arrayed rollers 40a, b, and c. The axis of roller 40c is connected to a pivotal bar 42 that is urged rearwardly by a biasing spring 44 to maintain tension in the belt 38. An idler roller 46 facilitates feeding of the document into the linear exit segment 34.

The document 30 is transported through the curvilinear segment 36 by what is commonly referred to in the art as a read drum 48. The drum 48 is in the shape of a thin cylindrical disk and has its peripheral edge 66 formed of an adherent material that cooperates with the belt 38 to securely grip or engage the document 30 as it passes through the curvilinear segment 36 of the transport track.

The read drum 48 is mounted for rotation on a shaft 50. The shaft is journalled through a bearing cell 52 and an idler pulley 54. The idler pulley 54 is driven by a drive pulley 56 through a belt 58. The drive pulley 56 is driven off the shaft of a drive motor 60.

A write head 62 is fixedly disposed below the read drum 48 along the curvilinear track section 36 in proximity to the entry track segment 32. When the document 30 passes by the write 62 it is subjected to a sinusoidally-varying magnetic field which magnetically energizes the magnetic ink characters in the manner illustrated in FIGS. 2 and 3.

A read head 64 is similarly fixedly mounted under the read drum 48 along the curvilinear track segment 36 in proximity to the linear exit segment 34. The read head 64 senses the magnetically energized magnetic ink characters and provides a signal to a recognition circuit (not shown, but known in the art). In practice, the read head 64 may comprise a plurality of horizontal tracks, and for each track there will be one or more separate read head elements.

In accordance with the present invention, an optical tachometer 70 is mounted between the upper surface of the bearing cell 52 and the bottom surface of the read drum 48. The optical tachometer 70 provides a means for measuring the angular displacement of the shaft 50 and compensating for any variations in rotational speed, no matter how slight, that may affect proper magnetic polarization of the magnetic ink characters. More specifically, a speed-up or slow-down of the read drum 48 may cause the phase and frequency variation in the magnetization of each vertical segment in the character field 20 of FIG. 2. This will result in a magnetic image at variance with the ideal magnetic image of FIG. 3, and may cause impairment of the reading and recognition of the character.

In the standard MICR convention presently in use with banking systems, each discrete, vertical segment of a character is assigned a width of 0.013 inch. Within each segment the magnetization must undergo two polarity swings, as was previously described in the case of a sinusoidal energizing signal. Therefore, in the preferred embodiment, two signals should be generated over each segment width of 0.013 inch, or one signal for each 0.0065 inch of document travel. This requires that the diameter of the read drum 48 and the slit density of the tachometer have an interdependent relationship. In a practical embodiment, the read drum may have a 26-inch circumference (i.e. 8.28-inch diameter) with a tachometer having 4,000 slits; this will give the desired 0.0065-inch/signal ratio. In practice the specific dimensions of the read drum and tachometer may be varied, so long as the desired ratio is maintained. Alternatively, a slight trade-off in performance can be made for an improvement in economy, by using a 2,000-line tachometer and phase shifting each output signal by 90° to double the number of output signals and effectively simulate a 4,000-slit tachometer.

Figure 5:
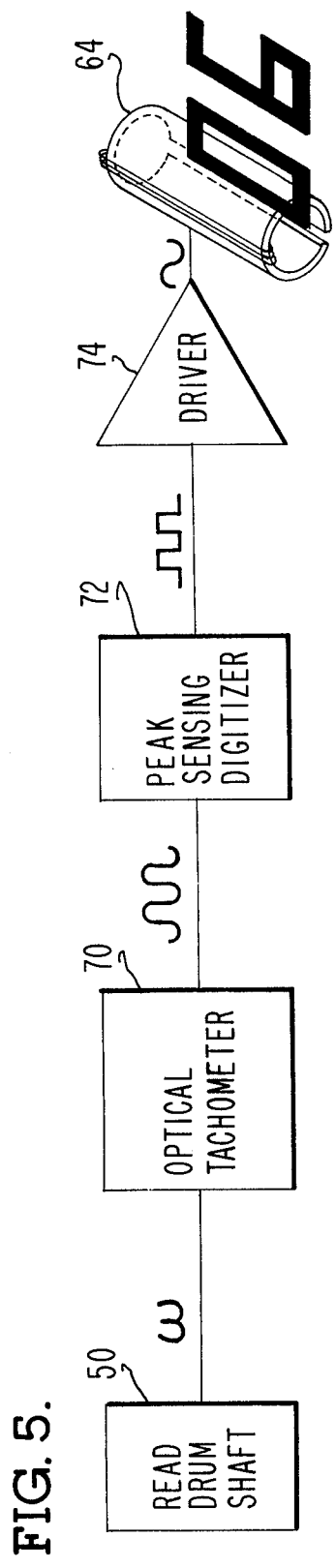
FIG. 5 is a schematic illustration of the means employed in association with the magnetic ink character recognition system of FIG. 4 to time correlate the positioning and magnetization of the character field of FIG. 2.

FIG. 5 represents a schematic implementation of the portion of the MICR system of FIG. 4 pertinent for an understanding of the present invention. More specifically, the read drum shaft 50 has its angular output w sensed by the optical tachometer 70 in the manner hereinbefore described. The analog output of the optical tachometer 70 is input to a peak sensing digitizer 72. The digitizer 72 senses the peak of each of the tachometer output signals and responds by outputting a digital pulse. Moreover, the peak sensing digitizer 72 may function to output two digital pulses for every one analog input from the optical tachometer if a 2,000 slit tachOmeter is used. The U.S. Pat. No 3,878,446, to Brandt teaches a peak sensing digitizer 72 satisfactory for the purposes of the present invention, and is incorporated by reference herein.

The digital pulses from the peak sensing digitizer 72 are received as input by a sinusoidal driver 74. The driver responds to each pulse to provide a sinusoidal output current to the write head, symbolically represented by 64. The write head magnetically energizes each discrete segment or line of the character field in a manner hereinbefore discussed in relation to FIGS. 2 and 3.

By using the implementation of FIG. 5, the magnetic energization of each discrete segment of a character field is independent of irregularities or non-uniformities in the drum rotation. More precisely, each discrete segment will be uniformly magnetized without phase offset or frequency variation caused by inertial problems in the read drum 48 or its associated driving mechanism.

The invention has been described in an illustrative manner, and it is to be understood that the terminology which has been used is intended to be in the nature of words of description rather than limitation.

Obviously, many modifications and variations of the present invention are possible in light of the above teachings. Consider, for example, that the invention is not limited in application to a read drum document transport, but is equally adaptable to an in-line system within the skills of the practitioner. It is, therefore, to be understood that within the scope of the appended claims, the invention may be practiced otherwise than as specifically described.

The embodiments of the invention which an exclusive property or privilege is claimed are defined as follows:

1. An improved magnetic ink character recognition (MICR) system of the class wherein a record medium, bearing encoded characters formed of magnetizable ink, is transported by record transport means past a write station which magnetically energizes each of the encoded characters in discrete segments, the improvement comprising:

timing means, responsive to the velocity of the record medium through the sensing of the displacement of the record transport means, for correlating the magnetization of each discrete segment with the velocity at which the record medium is being transported to compensate for any non-uniformities in transport velocity.

2. The MICR system of claim 1, wherein the record medium is transported by rotational motive means, and the timing means includes a tachometer responsive to the angular velocity of the rotational motive means.

3. The MICR system of claim 2, wherein the timing means is responsive to output a discrete signal for each discrete segment of an encoded character.

4. The MICR system of claim 3, wherein the timing means further includes digitizer means fOr translating each discrete signal to a digital pulse.

5. The MICR system of claim 4, wherein the timing means further includes sinusoidal driver means, responsive to a digital pulse from the digitizer means, for applying a sinusoidal magnetizing signal to a discrete segment of an encoded character.

6. The MICR system of claim 2, wherein the tachometer uses light energy as a sensed variable.

7. The MICR system of claim 2, wherein the rotational motive means is defined to include a rotating drum having a peripheral edge engageable with the record medium.

8. Apparatus for magnetically energizing magnetic ink characters encoded on a record medium, each magnetic ink character being divisible into a plurality of discrete, co-equal segments, the apparatus comprising:

transport means for engaging the record medium and transporting it past a write station;

displacement sensor means for sensing the displacement of the record medium through the write station in correlation with the direct sensing of the displacement of the transport means and outputting a discrete signal for each amount of displacement corresponding to one discrete magnetic ink character segment; and magnetic energization means, responsive to the output of the displacement sensor means, for magnetically energizing one discrete magnetic ink character segment for each discrete signal of the sensor means.

9. The apparatus of claim 8, wherein the transport means are rotational, and the displacement sensor means includes a tachometer sensitive to the angular velocity of the transport means.

10. The apparatus of claim 9, wherein the tachometer comprises an optical tachometer.

11. The apparatus of claim 9, wherein the rotational transport means is defined to include a rotating drum having a peripheral edge engageable with the record medium.

12. The apparatus of claim 8, wherein the displacement sensor means further includes digitizer means for translating the discrete signal into a digital pulse.

13. The apparatus for claim 12, wherein the magnetic energization means further includes sinusoidal driver means, responsive to a digital pulse from the digitizer means, for applying a sinusoidal magnetizing signal to a discrete segment of an encoded character.

* * * * *